Figure 1:
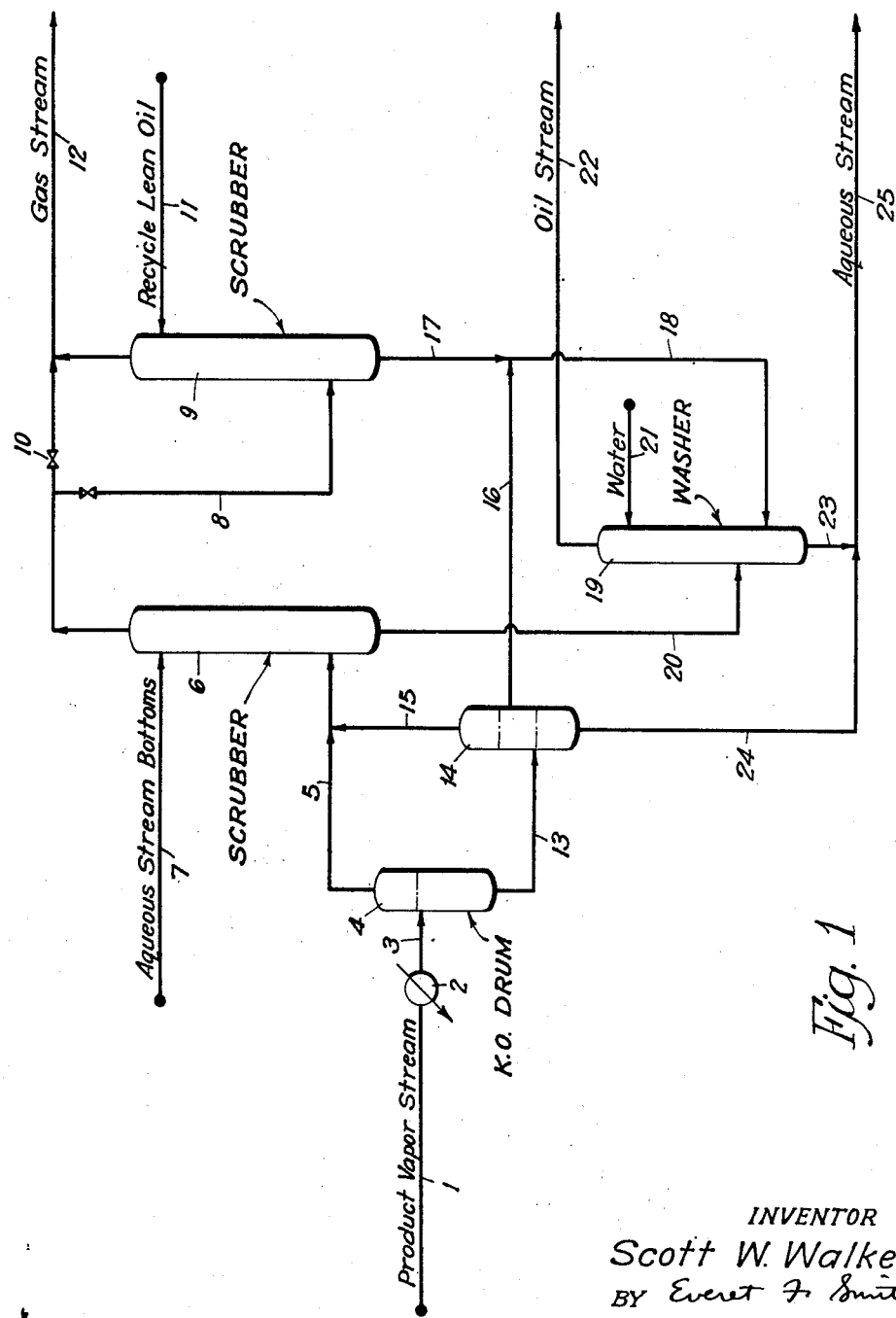

Oct. 12, 1954

S. W. WALKER 2,691,669

EXTRACTION OF ORGANIC COMPOUNDS
WITH CARBOXYLIC ACID SALTS

Filed Dec. 22, 1949

4 Sheets-Sheet 1

INVENTOR
Scott W. Walker
BY Everet F. Smith
PATENT AGENT

INVENTOR.
Scott W. Walker
BY Everet F. Smith
PATENT AGENT

Patented Oct. 12, 1954

2,691,669

UNITED STATES PATENT OFFICE 2,691,669

EXTRACTION OF ORGANIC COMPOUNDS WITH CARBOXYLIC ACID SALTS

Scott W. Walker, Tulsa, Okla., assignor to Stanolind Oil and Gas Company, Tulsa, Okla., a corporation of Delaware Application December 22, 1949, Serial No. 134,475

17 Claims. (Cl. 260—450)

This invention relates to the separation of organic oxygenated compounds from mixtures thereof with hydrocarbons, and more particularly to a method for segregating, separating, and purifying alcohols, aldehydes, and/or ketones from hydrocarbon solutions.

My invention broadly comprises an improvement in the method, disclosed in the copending application of Vesta F. Michael, Serial No. 771,318, filed August 29, 1947, now abandoned in favor of copending application Serial No. 134,480, a continuation-in-part thereof, filed December 22, 1949, for separating organic oxygenated compounds from hydrocarbon solutions thereof by extracting the oxygenated compounds with an aqueous solution of a solubilizer consisting essentially of a substantially non-surface-active salt of a preferentially oil-soluble carboxylic acid, suitably an acid containing fewer than twelve carbon atoms in the molecule. Specifically, I have discovered that greatly improved results are obtained by carrying out the extraction with an extractant solution containing above about 30 percent by weight of a salt of the defined class.

The Michael process, referred to above, and my improvement thereon are suitable in general for separating organic oxygenated compounds from mixtures thereof with hydrocarbons. Such mixtures may be prepared by various processes, including the direct oxidation of natural gas or of other hydrocarbon gases, the hydrogenation of carbon monoxide in the Fischer-Tropsch process or its various modifications, particularly those modifications employing alkali-promoted iron catalysts, and the reaction of olefins with carbon monoxide and hydrogen in the so-called "Oxo" process.

Within recent years, a new and improved process for the hydrogenation of carbon monoxide has been developed which permits the use of the fluidized-catalyst technique. This new technique, when used under carefully chosen conditions of temperature, pressure, and space velocity, gives not only much greater space-time yields, but also when used with a reduced iron catalyst promoted with from 0.5 to 2 percent by weight of an alkali-metal compound such as potassium hydroxide, potassium carbonate, or potassium fluoride, it gives products of a more desirable boiling range, higher octane number, and higher content of organic oxygenated compounds.

In one embodiment of the new fluidized-iron process, for example, wherein a reduced iron catalyst containing around 1 percent by weight of potassium carbonate is used to hydrogenate carbon monoxide, a water layer containing up to 15 percent or more of organic oxygenated compounds, and a hydrocarbon layer containing up to 40 percent or more of organic oxygenated compounds are produced under the following approximate conditions:

Temperature _____ 550–650° F.
Pressure _____ 100–500 lb./in.$^2$ gage.
Space velocity _____ 4–20 cubic feet of CO, measured at 60° F. and one atmosphere, per pound of iron per hour.
CO concentration in feed__ 10–20 percent by volume.
H$_2$:CO ratio in total feed_ 1.5–6.

Two layers have been found to contain the following oxygenated compounds, and others: acetaldehyde, propionaldehyde, butyraldehyde, isobutyraldehyde, and higher aliphatic aldehydes; acetone, methyl ethyl ketone, methyl n-propyl ketone, methyl n-butyl ketone, and higher aliphatic ketones; cyclopentanone, methylcyclopentanones, and other alicyclic ketones; methanol, ethanol, n-propyl alcohol, isopropyl alcohol, n-butyl alcohol, isobutyl alcohol, 2-butanol, n-pentyl alcohol, 2-methyl-1-butanol, 3-methyl-1-butanol, n-octyl alcohol, and higher aliphatic alcohols; acetic acid, propionic acid, butyric acid, 2-methylbutyric acid, valeric acid, 3-methylvaleric acid, 2-methylhexanoic acid, caprylic acid, capric acid, myristic acid, palmitic acid, stearic acid, and other aliphatic carboxylic acids, esters derivable from the foregoing alcohols and acids, such as methyl acetate, ethyl acetate, ethyl butyrate, and the like; formals, acetals, and ketals derivable from the foregoing aldehydes, ketones, and alcohols; and phenol and higher phenols. The hydrocarbons in the product comprise virtually the entire range of saturated and olefinic hydrocarbons, from dissolved methane to high-melting waxes. The following table illustrates the daily output of the major organic oxygenated products from a plant employing the new process to produce 6,000 barrels per day (42 gallons per barrel) of gasoline-range hydrocarbons:

| Aqueous phase: | Gal./day |
|---|---|
| Acetaldehyde | 4,247 |
| Propionaldehyde | 873 |
| Acetone | 5,170 |
| Methanol | 333 |
| Butyraldehyde | 1,231 |
| Methyl ethyl ketone | 2,171 |
| Ethanol | 30,322 |
| n-Propyl alcohol | 6,879 |
| n-Butyl alcohol | 2,306 |
| n-Pentyl alcohol | 504 |
| Acetic acid | 8,609 |
| Propionic acid | 3,217 |
| Butyric acid | 1,579 |

Hydrocarbon phase: Gal./day
    Aldehydes and ketones _____ 3,964
    Alcohols _____ 4,492
    Acids _____ 3,629

The distribution of carboxylic acids in a typical aqueous phase and in a typical hydrocarbon phase produced in a fluidized-catalyst hydrocarbon synthesis process as described above was as follows, based on the total carboxylic acids in each phase:

| Carboxylic Acid | Aqueous Phase, mole-percent | Hydrocarbon Phase, mole-percent |
| --- | --- | --- |
| Acetic | 73.6 | 1.06 |
| Propionic | 16.9 | 2.26 |
| $C_4$ | 6.4 | 14.08 |
| $C_5$ | 2.6 | 23.46 |
| $C_6$ | 0.5 | 18.92 |

Michael discovered that organic oxygenated compounds can be separated conveniently and effectively from hydrocarbon solutions by extraction with an aqueous solution of a salt of a preferentially oil-soluble carboxylic acid containing fewer than twelve carbon atoms in the molecule, as disclosed in his copending application referred to above. Such salts are substantially non-surface-active, and have comparatively little tendency to form emulsions during the extraction of hydrocarbon solutions. In general, water-soluble salts of mixed oil-soluble carboxylic acids comprising predominantly acids having fewer than twelve carbon atoms in the molecule, or salts of mixtures of oil-soluble carboxylic acids having a weighted average of less than eleven carbon atoms in the molecule, are suitable for use in the process. In particular, alkali-metal salts of oil-soluble aliphatic carboxylic acids produced in the hydrogenation of carbon monoxide, as described above, are convenient solubilizers for use in the process.

I have now found that the extraction of organic oxygenated compounds may be carried out more advantageously with extractant solutions containing above about 30 percent by weight of the solubilizer salts employed by Michael, and in particular I have discovered that carbonyl compounds may be more efficiently extracted by use of extractant solutions having such concentrations.

One object of my invention is to provide a method for separating organic oxygenated compounds from mixtures thereof with hydrocarbons. Another object of my invention is to provide a process for recovering preferentially oil-soluble organic oxygenated compounds, such as alcohols, aldehydes, ketones, carboxylic acids, and phenolic compounds, from hydrocarbon solutions thereof, suitably hydrocarbon solutions resulting from the oxidation of hydrocarbon gases, or from the hydrogenation of oxides of carbon, in particular carbon monoxide. Another object of my invention is to produce a hydrocarbon product relatively free of organic oxygenated compounds. A still further object is to produce a motor fuel of relatively good odor and of improved stability with respect to anti-knock rating. Other objects of my invention, and its advantages over the prior art, will be apparent from the following description.

In a particularly useful embodiment of my invention, I have effected the substantially complete removal of alcohols, aldehydes, and ketones from a hydrocarbon solution thereof by contacting the hydrocarbon solution with an aqueous solution containing from above about 30% by weight of a substantially non-surface-active alkali-metal salt of a preferentially oil-soluble carboxylic acid.

In another embodiment, I have effected the removal of alcohols, aldehydes, ketones, carboxylic acids, and phenolic compounds from a hydrocarbon solution thereof by contacting the hydrocarbon solution with an aqueous solution containing free alkali and above about 30% by weight of a substantitally non-surface-active alkali-metal salt of a preferentially oil-soluble carboxylic acid.

I have also succeeded in segregating organic oxygenated compounds and hydrocarbons by various combinations of my invention with other process steps. Such a combination may include the following steps:

1. Separation of aldehydes and ketones from the hydrocarbon solution.
2. Extraction of the hydrocarbon raffinate from step 1 with an aqueous solution of a mild alkali to remove carboxylic acids.
3. Extraction of the hydrocarbon raffinate from step 2 with an aqueous caustic solution, such as aqueous sodium hydroxide, to separate phenolic compounds.
4. Extraction of the hydrocarbon raffinate from step 3 with an aqueous solution containing above about 30% by weight of an organic oxygenated-compound solubilizer, consisting essentially of a substantially non-surface-active salt of a preferentially oil-soluble carboxylic acid, to remove alcohols and any residual carbonyl compounds.

4a. Alternatively, the hydrocarbon raffinate from step 1 may be extracted with an aqueous solution of solubilizer, as defined in step 4, plus a caustic compound. In this modification, the alcohols, residual carbonyl compounds, carboxylic acids, and phenolic compounds are removed simultaneously in the aqueous extract.

4b. As a further alternative, the hydrocarbon raffinate from step 1 may be extracted with an aqueous solution of solubilizer, as defined in step 4, plus a mild alkali. In this modification, the alcohols, residual carbonyl compounds, and carboxylic acids are removed simultaneously, together with a portion of the phenolic compounds. This modification is particularly applicable when only small proportions of phenolic compounds are present in the hydrocarbon. The remaining phenolics may subsequently be extracted with an aqueous caustic solution, if desired.

It will be apparent that the order of steps 2, 3, and 4 may be changed in various ways without detracting materially from the advantages of my process.

In step 1, as defined above, the separation of aldehydes and ketones may be carried out by known means, as by reaction to form solid derivatives, well known in the art, which may be removed by filtration or by reaction with bisulfites to form water-soluble addition compounds. I prefer to carry out the separation by the latter method, utilizing an aqueous solution of a water-soluble bisulfite, such as sodium bisulfite, to extract aldehydes and ketones from the hydrocarbon solution, and operating under conditions disclosed in the prior art.

The extractant solution used in step 3, and in the other embodiments of my invention described above, contains at least about 30 percent by weight of a solubilizer consisting essentially of a salt of a preferentially oil-soluble carboxylic acid containing fewer than twelve carbon atoms in the molecule, preferably an aliphatic carboxylic acid. Alkali-metal salts, for example, of such acids are substantially non-surface-active, and have been found to have little or no tendency to form emulsions under the conditions employed in my process. In this respect, the solubilizers used in my process are vastly superior to the fatty-acid soaps, such as sodium oleate and sodium stearate, for the same purpose in the prior art, since the soaps cause the formation of emulsions that are virtually impossible to break. It has further been shown that salts of various mixtures of organic acids are distinctly superior to salts of single acids; and it is particularly advantageous to use an aqueous solution of salts of the carboxylic acids appearing in the hydrocarbon phase produced by the hydrogenation of carbon monoxide in one of the various processes described above, and extracted in one of the subsidiary steps of my process, as set forth below in a specific example. The latter composition ordinarily consists predominantly of alkanoates having fewer than eleven carbon atoms in the molecule. It is unnecessary to exclude surface-active soaps from the solubilizer composition altogether; but in order to avoid emulsification difficulties, the solubilizer should comprise predominantly the non-surface-active constituents as defined above, and should preferably contain around 75 percent or more of such non-surface-active constituents. It is also unnecessary to exclude salts of preferentially water-soluble carboxylic acids from the solubilizer composition, but such salts do not in general contribute substantially to the extraction of preferentially oil-soluble organic oxygenated compounds. The presence of such salts is desirable as a means of reducing emulsion formation where the solubilizer contains surface-active salts.

The non-surface-active salts of preferentially oil-soluble carboxylic acids suitable for use as active constituents of the solubilizer composition employed in my process are water-soluble metal-organic compounds that are to be understood as including alkanoates such as butyrates, valerates, caproates, undecanoates, and the like, of the alkali metals, in particular sodium and potassium, and of ammonium and substituted ammoniums; alkeneoates such as crotonates, isocrotonates and the like; alkanedioates such as adipates, azelates, sebacates, and the like; and alkenedioates such as fumarates and the like.

It has also been found advantageous to incorporate in the solubilizer solution a quantity, suitably up to around 10 percent, of a lower aliphatic alcohol, such as methanol, ethanol, or isopropyl alcohol, to assist in the extraction of higher-molecular-weight oxygenated compounds.

The operating conditions required in the utilization of my concentrated extractant solutions are not critical. The temperature during the extraction should be held at a sufficiently high level to maintain the extractant solution in fluid form. For this purpose, the required temperature varies directly as a function of the solubilizer concentration. For example, extractant solutions containing around 30 percent by weight of solubilizer are fluid at room temperature or at slightly elevated temperatures, whereas 70 percent solutions require temperatures of 55° C. or above. Solubilizer concentrations of 70 percent by weight or somewhat higher may be employed under appropriate conditions; however, I ordinarily choose to use concentrations between 30 and about 60 percent by weight. Within my preferred concentration range, temperatures as low as from 20 to 50° C. are suitable, depending on the solubilizer concentration, and I have found temperatures as high as 100° C. and above to be operative. Pressure equipment may be utilized to prevent escape of the various liquids through volatilization. The ratio of extractant solution to charging stock may suitably be chosen within a wide range, for example from about 0.1:1 to 2:1 or more, but I prefer to operate within the range of about 0.5:1 to 1:1. The pH level may satisfactorily be high enough or low enough for free base or free acid to be present, but I prefer to operate between about pH 7 and pH 9.

Removal of the organic oxygenated compounds from the rich extractant solution may be accomplished by steam distillation; or by extraction with a suitable immiscible solvent, such as a light hydrocarbon, suitably propane, butane, pentane, hexane, and the like, or an aliphatic ether, suitably ethyl ether, n-propyl ether, isopropyl ether, n-butyl ether, isoamyl ether, and the like; or by successively steam distilling and extracting. In all of these methods, it may be desirable to add an anti-foam agent, such as a silicone.

Figure 3:
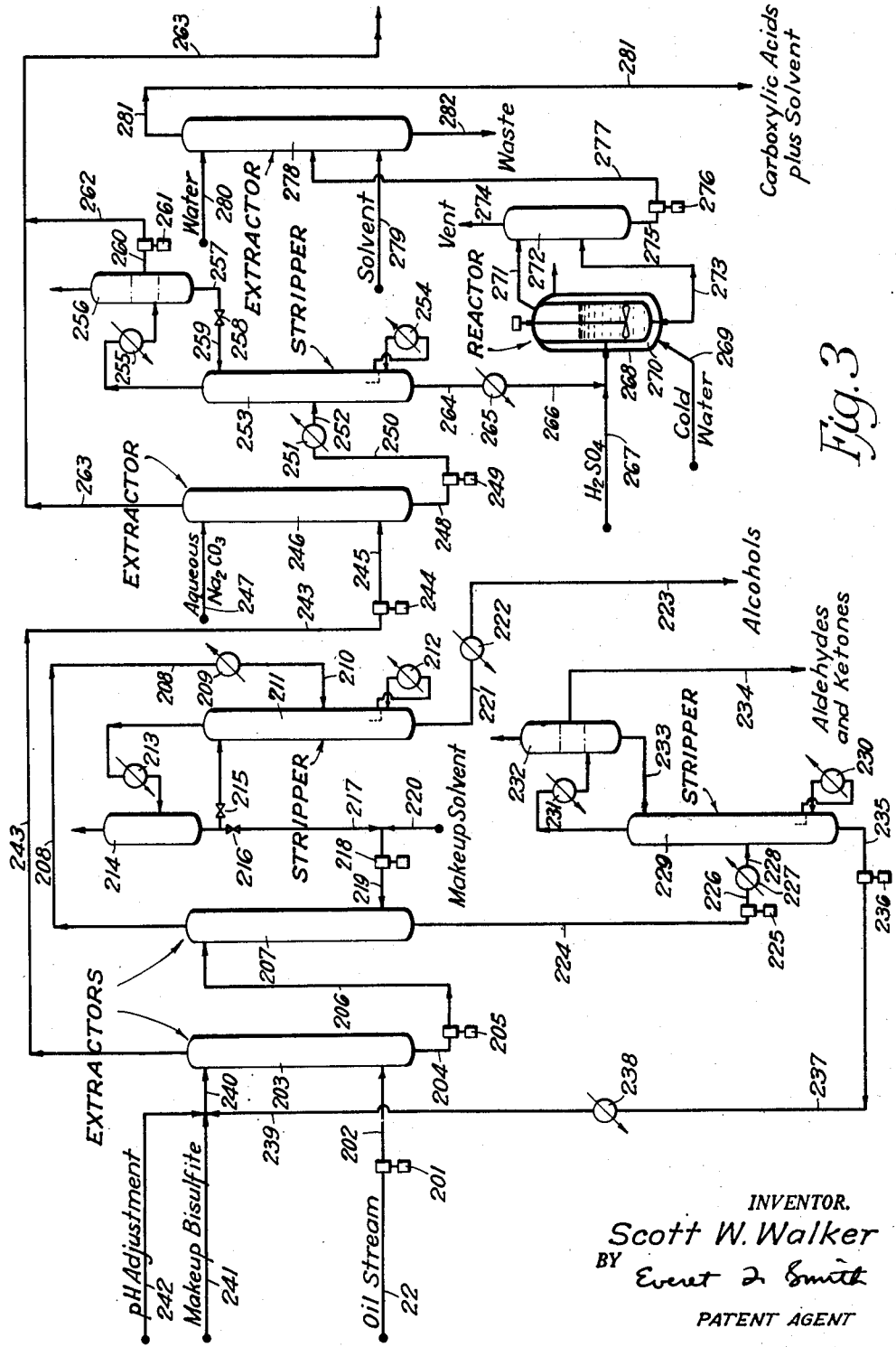

Subsequent processing of the various fractions produced in the treatment of hydrocarbon solutions of organic oxygenated compounds according to my invention may be carried out by methods known in the art, or described in copending applications. Specifically, fractional distillation, azeotropic distillation, and extractive distillation may be employed for separating the individual components of the aldehyde and ketone mixture that is obtained in step 1, described above, and of the alcohol mixture that is separated from the step 4, 4a, or 4b extract. Similar techniques may be utilized further to purify the hydrocarbon raffinate streams obtained at various stages of my process; or the hydrocarbon raffinates may be contacted with various adsorption agents, such as silica gel, activated alumina, and the like, to separate substantially all oxygenated compounds therefrom. The aqueous solution of solubilizer and organic oxygenated compounds obtained in step 4a, or 4b may first be processed to separate the oxygenated compounds, as previously described; subsequently a portion may be withdrawn for isolation of the organic acids, as illustrated in Figure 3, below; and the remainder of the depleted solubilizer solution may be recycled to the 4a or 4b extraction step. The aqueous solutions of organic-acid salts resulting from steps 2, 4a or 4b, after separation of the oxygenated compounds, may be treated with a strong acid such as sulfuric acid, to regenerate the organic acids, and the organic acids may then be withdrawn and further processed, as by fractional distillation. This same procedure is suitable for further processing the aqueous solution of phenolates resulting from steps 3, 4a or 4b.

Figure 2:
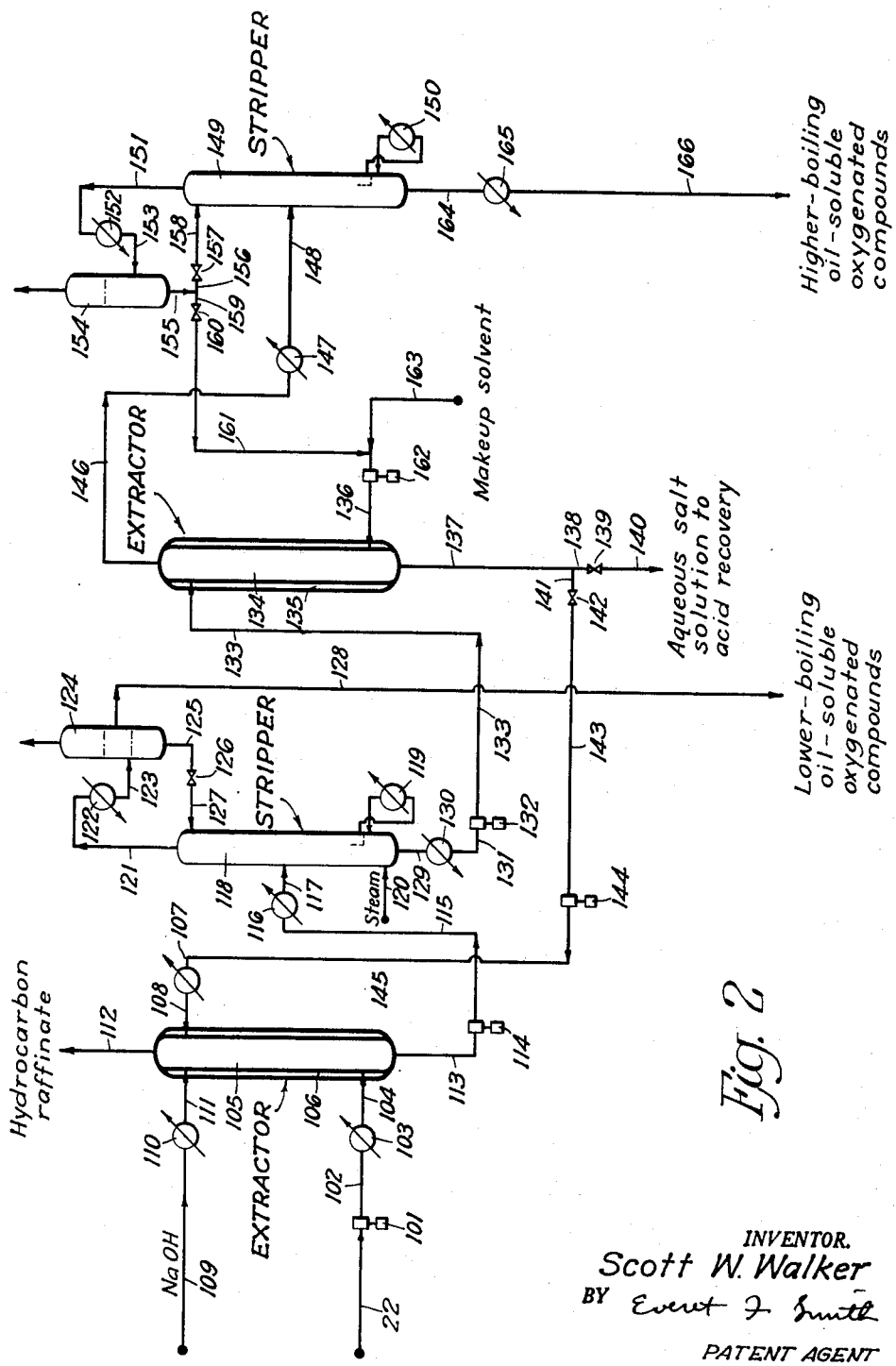

The attached flowsheets, Figures 1 and 2, illustrate an embodiment or my invention suitable for removing all but a minor proportion of organic oxygenated compounds, including alcohols, aldehydes, ketones, carboxylic acids, and phenolic compounds, from a hydrocarbon solution thereof by a single extraction with an aqueous extractant solution containing free alkali and a proportion of solubilizer within my preferred concentration range.

In the application of my invention to the treatment of a hydrocarbon stream from a process, for example, in which the product is a vaporous stream containing normally liquid hydrocarbons, organic oxygenated compounds, and water, the vaporous stream is first condensed at least partially, and is then separated into a gas stream, an oil stream, and a water stream. A convenient method for carrying out this separation is illustrated in Figure 1:

The product vapor stream flows through line 1 into the heat interchanger 2, where the normally liquid constituents are condensed partially or completely, and the resulting mixture of gases, oil, and water flows through line 3 into knockout drum 4. The gas stream emerges from the latter through line 5, and is successively passed upward through scrubbers 6 and 9. The liquids from the knockout drum flow through the line 13 into separator 14, where the phases are permitted to separate. The separator is vented to gas line 5 through line 15.

Into the top of scrubber 6, a stream of water may be introduced through line 7. Preferably, however, a dilute aqueous solution of water-soluble fatty acids, such as the bottom stream obtained in topping the aqueous phase from separator 14, is fed into the top of scrubber 6. Substantially all of the water-soluble organic oxygenated compounds are removed from the gas stream in scrubber 6. Into the top of scrubber 9 is introduced a lean oil through line 11, suitably a portion of a hydrocarbon stream that has been partially or completely denuded of oxygenated compounds in a later stage of my process. Scrubber 9 may be by-passed by valve 10 if desired. The scrubbed gases, now virtually entirely free of organic oxygenated compounds, emerge from the top of scrubber 9 through line 12, and may be returned to process or otherwise disposed of.

By regulating the temperature within separator 14, the distribution of oxygenated compounds between the oil and water phases may conveniently be controlled as desired. It has been observed that the higher the temperature within separator 14, the lower the concentration of organic oxygenated compounds in the aqueous phase.

The oil phase from separator 14 is withdrawn through line 16 and combined with the bottoms emerging from scrubber 9 through line 17, and the mixture is passed through line 18 into the bottom of washer 19. The aqueous bottoms emerging from scrubber 6 through line 20 are introduced into washer 19 at an intermediate point, and into the top of washer 19 is introduced a stream of fresh water through line 21. As the oil stream rises through washer 19, it is therefore scrubbed successively with a dilute aqueous solution of organic oxygenated compounds and then with fresh water. Substantially all of the water-soluble organic oxygenated compounds are thereby removed from the oil stream, which emerges through line 22 and is then further treated according to the process of my invention, in order to segregate oil-soluble organic oxygenated compounds therefrom.

The water stream from separator 14 is withdrawn through line 24 and mixed with the aqueous bottoms emerging from washer 19 through line 23. The aqueous mixture flows through line 25 to further processing steps, as desired, for separation and purification of the components thereof.

The hydrocarbon stream from washer 19 (Figure 1) flows through line 22 into pump 101 (Figure 2), from which it is transferred through line 102, heater 103, and line 104 into the bottom of extractor 105, equipped with heating jacket 106. Within the extractor, the hydrocarbon stream rises countercurrent to a downward-flowing aqueous extractant solution containing around 50 percent by weight of sodium salts of a mixture of organic acids obtained from the hydrocarbon phase resulting from the hydrogenation of carbon monoxide over an alkali-promoted iron catalyst. The extractant solution is heated in heater 107 to a temperature sufficient to maintain it in fluid condition, suitably around 50° C., and is introduced into the top of extractor 105 through line 108. In addition, a sufficient quantity of sodium hydroxide or other alkali to react with the organic acids, such as carboxylic acids and phenolic compounds, present in the hydrocarbon stream is introduced into the top of extractor 105 through line 109, heater 110, and line 111. The temperature within the extractor is maintained at the desired level by introducing steam or hot water into jacket 106, and the extractor may be operated under superatmospheric pressure to avoid volatilization losses and to prevent disturbances within the extractor arising from the release of volatile matter therein. The combined aqueous alkaline salt solution entering the top of the extractor dissolves the organic oxygenated compounds from the hydrocarbon stream, and the hydrocarbon raffinate emerging from the top of the extractor is transferred through line 112 to storage or to further processing.

The aqueous extract emerging from the bottom of extractor 105 through line 113 is transferred by pump 114 through line 115, heater 116, and line 117 into stripper 118 at an intermediate point. Therein, the aqueous extract is subjected to a mild steam-stripping operation by means of reboiler 119 and free steam introduced through line 120. Lower-boiling oil-soluble organic oxygenated compounds, together with water vapor, emerge overhead through line 121 and are condensed in cooler 122. The condensate flows through line 123 into separator 124, from which the water phase is refluxed to the stripper through line 125, valve 126, and line 127; and the organic layer, comprising the lower-boiling oil-soluble organic oxygenated compounds, is withdrawn through line 128 to storage or further processing.

The stripped aqueous stream emerging from the bottom of stripper 118 through line 129 passes through heat exchanger 130, and is then allowed to flow through line 131 into pump 132, from which it is transferred through line 133 into the top of extractor 134, equipped with heating jacket 135, by means of which the temperature is regulated around 50° C. as in extractor 105. A stream of a suitable organic solvent for higher-boiling oil-soluble organic oxygenated compounds, preferably a lower-boiling hydrocarbon liquid, such as pentane, or a lower-boiling aliphatic ether, such as isopropyl ether, is introduced into the bottom of extractor 134 through line 136, and the organic oxygenated compounds are extracted from the aqueous stream by the solvent as the two streams pass countercurrently through the extractor.

The exhausted aqueous stream emerging from the bottom of extractor 134 through line 137 is split into two streams. A portion is withdrawn through line 138, valve 139, and line 140 and is sent to additional process steps (apparatus not shown) for regeneration and isolation of organic acids contained therein. The remainder of the aqueous stream in line 137 is recycled through line 141, valve 142, line 143, pump 144, line 145, heater 107, and line 108 to extractor 105.

A solution of higher-boiling oil-soluble organic oxygenated compounds in the organic solvent emerges from the top of extractor 134 and flows through line 146, heater 147, and line 148 into stripper 149 at an intermediate point. The solvent is stripped out by reboiler 150, and the solvent vapors emerge overhead through line 151 into condenser 152. The condensed solvent flows through line 153 into reflux drum 154, from which a portion is refluxed to stripper 149 through line 155, line 156, valve 157, and line 158, and the remainder is recycled to the bottom of extractor 134 through line 155, line 159, valve 160, line 161, and pump 162. Makeup solvent is added as needed through line 163, ahead of pump 162.

A stream of higher-boiling oil-soluble organic oxygenated compounds emerges from the bottom of stripper 149 through line 164 and cooler 165, and is withdrawn through line 166 to storage or to further processing.

Figure 4:
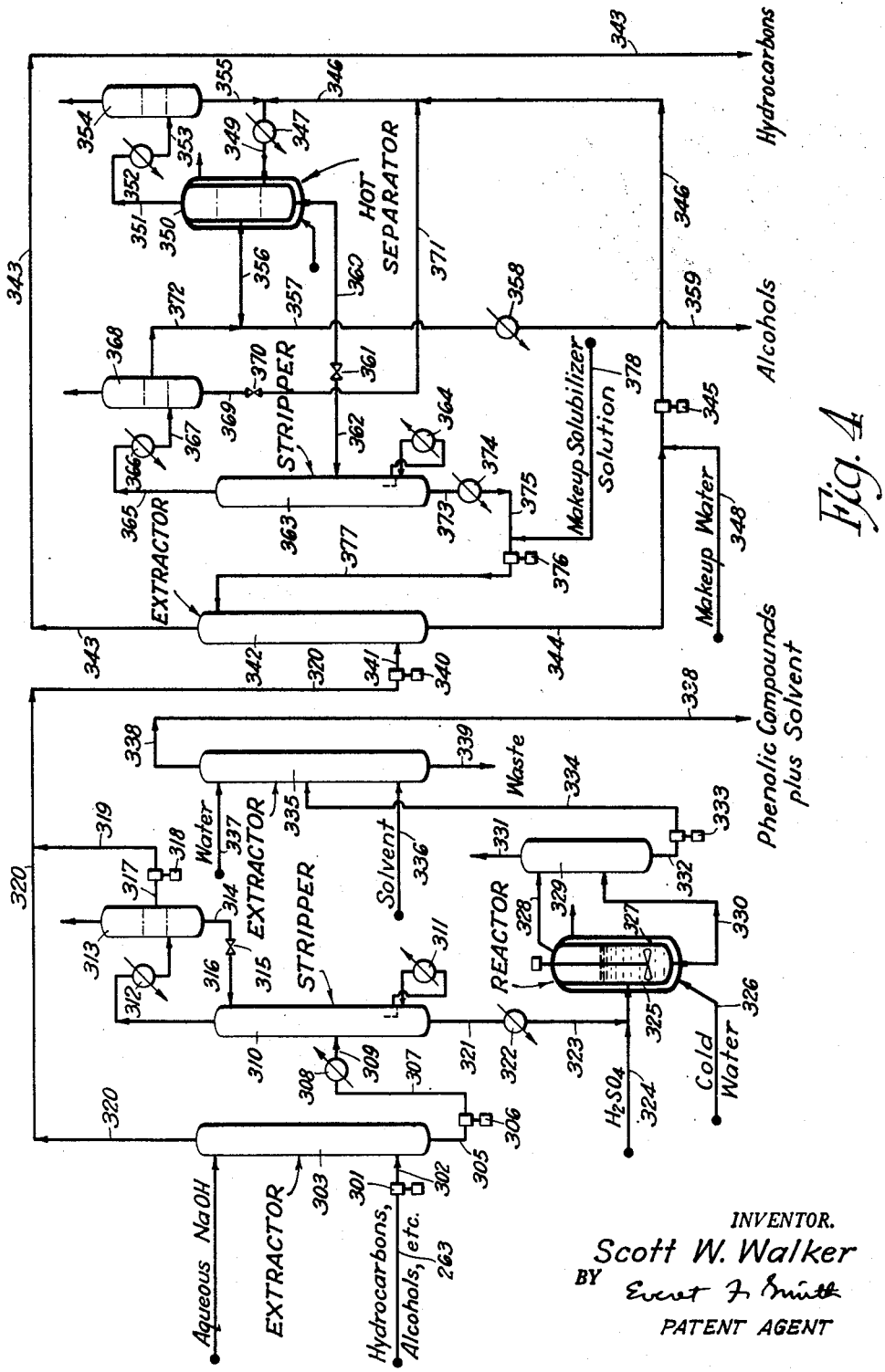

Figures 3 and 4 illustrate an embodiment of my invention adapted to effect the segregation of organic oxygenated compounds into generically dissimilar groups while carrying out their separation from a hydrocarbon solution.

The hydrocarbon stream from washer 19 (Figure 1) flows through line 22 into pump 201 (Figure 3), and from there through line 202 into extractor 203, where it rises countercurrent to a downward flowing aqueous 10 percent solution of sodium bisulfite at a temperature around 20° C. The sodium bisulfate reacts with the aldehydes and ketones, and the resulting adducts are transferred into the aqueous phase. The aqueous extract emerging from the bottom of extractor 203 through line 204 is transferred by pump 205 through line 206 to the top of extractor 207, where it is allowed to flow downward countercurrent to a stream of pentane, the minor quantity of alcohols dissolved in the aqueous stream being extracted thereby. The pentane extract emerging from the top of extractor 207 flows through line 208, heater 209, and line 210 into an intermediate point of stripper 211. Heat is supplied to the stripper by reboiler 212. The pentane is taken off overhead through condenser 213 to reflux drum 214, from which a portion is refluxed to stripper 211 through valve 215, and the remainder is recycled through valve 216, line 217, pump 218, and line 219, to the bottom of extractor 207, makeup solvent being added as required through line 220 ahead of pump 218. A mixture of alcohols is withdrawn from the bottom of stripper 211 through line 221 and cooler 222, and is transferred through line 223 to storage or to further processing.

The purified solution of bisulfite addition products flowing from the bottom of extractor 207 passes through line 224 into pump 225, by which it is transferred through line 226 into heater 227. Therein, the stream is heated to a temperature above about 80° C. and is discharged through line 228 into stripper 229, equipped with reboiler 230. In the stripper, the aldehydes and ketones are released from combination with the bisulfite, and are taken off overhead in admixture with water vapors through condenser 231 into separator 232. The aqueous phase from separator 232 is refluxed through line 233 to stripper 229, and the water-insoluble phase, comprising primarily aldehydes and ketones, is withdrawn through line 234 to storage or further processing.

A stream of regenerated bisulfite solution emerges from the bottom of stripper 229 through line 235, and is recycled to extractor 203 through pump 236, line 237, cooler 238, line 239, and line 240. Makeup bisulfite is added to the recycled stream as required through line 241 and 240, and the pH of the bisulfite stream is adjusted, preferably to between about 5 and 8, by addition of sodium hydroxide or sulfurous acid through lines 242 and 240.

The aldehyde-depleted and ketone-depleted hydrocarbon stream emerging from the top of extractor 203 through line 243 is transferred by pump 244 through line 245 into the bottom of extractor 246, where it flows upward countercurrent to an aqueous 7 percent solution of sodium carbonate introduced through line 247. In this extractor, sodium salts of the carboxylic acids are formed, and are dissolved in the water phase. The aqueous solution flows from the bottom of extractor 246 through line 248, pump 249, line 250, heater 251, and line 252 into stripper 253 at an intermediate point. Dissolved hydrocarbons and alcohols are stripped out of the solution by reboiler 254 and are taken overhead in admixture with water vapor through condenser 255 into separator 256, from which the aqueous phase is recycled to the stripper through line 257, valve 258, and line 259, and the hydrocarbon and alcohol phase is withdrawn through line 260, pump 261, and line 262 and combined with the hydrocarbon stream issuing from the top of extractor 246 through line 263. Since the hydrocarbon and alcohol phase from separator 256 consists mostly of alcohols, the stream in line 262 may be mixed with the alcohols in line 223, if desired. The stripped water solution from stripper 253 is withdrawn through line 264, cooler 265, and line 266, and is then acidified, preferably with sulfuric acid, added through line 267. The acidified mixture flows into an agitated reaction vessel 268, where it is cooled by cold water, introduced through line 269 into jacket 270. Carbon dioxide produced by the acidification is allowed to escape through vent line 271 into knockout drum 272. The acidified liquid flows from the bottom of reactor 268 through seal line 273 into knockout drum 272, where any remaining gases are separated and vented through line 274. From the bottom of knockout drum 272, the liquid emerges through line 275 and is transferred by pump 276 through line 277 into extractor 278 at an intermediate point. Into the bottom of the extractor is introduced through line 279 a solvent for fatty acids, which flows upward through the downward-flowing aqueous stream and extracts the fatty acids therefrom. Suitable solvents are aliphatic ethers, such as isopropyl ether, butyl ether, and the like; aromatic hydrocarbons, such as benzene, toluene, and the like; esters, such as ethyl acetate, butyl acetate, methyl butyrate, and the like; and high-boiling wood-oil fractions. Through line 280 at the top of the column is introduced a stream of fresh water, which washes any entrained or dissolved inorganic acid from the extract. The washed extract, comprising solvent and fatty acids, emerges through line 281 at the top of extractor 278, and is sent to storage or to further processing to isolate the various components of the mixture. The exhausted aqueous stream emerging through line 282 at the bottom of extractor 278 is discarded.

The aldehyde-, ketone-, and carboxylic acid-depleted hydrocarbon stream emerging from the top of extractor 246 flows through line 263 (Figure 3) into pump 301 (Figure 4) and is transferred thereby through line 302 into the bottom of extractor 303, where it flows upward countercurrent to an aqueous ten percent sodium hydroxide solution, introduced through line 304. In this extractor, sodium phenolates are formed, and are dissolved in the water phase. The aqueous solution flows from the bottom of extractor 303 through line 305, pump 306, line 307, heater 308, and line 309 into stripper 310 at an intermediate point. Dissolved hydrocarbons and alcohols are stripped out of the solution by reboiler 311 and are taken overhead in admixture with water vapor through condenser 312 into separator 313, from which the aqueous phase is refluxed to the stripper through line 314, valve 315, and line 316, and the hydrocarbon and alcohol phase is withdrawn through line 317, pump 318, and line 319 and combined with the hydrocarbon stream issuing from the top of extractor 303 through line 320. Since the hydrocarbon and alcohol phase from separator 313 consists mostly of alcohols, the stream in line 319 may be mixed with alcohols in lines 262 and 223 (Figure 3) if desired.

The stripped water solution from stripper 310 is withdrawn through line 321, cooler 322, and line 323, and is then acidified, preferably with sulfuric acid, added through line 324. The acidified mixture flows into an agitated reaction vessel 325, where it is cooled by cold water, introduced through line 326 into jacket 327. The reaction vessel is vented through line 328 to knockout drum 329. The acidified liquid flows from the bottom of reactor 325 through seal line 330 into knockout drum 329, where any entrained gases are separated and vented through line 331. From the bottom of knockout drum 329, the liquid emerges through line 332 and is transferred by pump 333 through line 334 into extractor 335 at an intermediate point. Into the bottom of the extractor is introduced through line 336 a solvent for phenolic compounds, which flows upward through the downward-flowing aqueous stream and extracts the phenolic compounds therefrom. Suitable solvents are aromatic, naphthenic, and saturated aliphatic hydrocarbons, such as benzene, toluene, cyclohexane, methylcyclopentane, hexanes, octanes, and the like. Through line 337 at the top of the column is introduced a stream of fresh water, which washes any entrained or dissolved inorganic acid from the extract. The washed extract, comprising solvent and phenolic compounds, emerges through line 338 at the top of extractor 335, and is sent to storage or to further processing to isolate the various components of the mixture. The exhausted aqueous stream emerging through line 339 at the bottom of extractor 335 is discarded.

The hydrocarbon stream emerging from the top of the extractor 303, for which most of the carbonyl compounds, acids, and phenolic compounds have been removed, flows through line 320 into pump 340 and is transferred thereby through line 341 into the bottom of extractor 342, where it flows upward countercurrent to an aqueous solubilizer stream containing around fifty percent of sodium carboxylic acid salts having a weighted average of nine carbon atoms in the molecule. The contents of the extractor are preferably maintained at a temperature above about 50° C. in order to avoid any tendency of the aqueous solubilizer stream to gel, and the extraction is preferably carried out under somewhat elevated pressure in order to avoid volatilization losses. The alcohols are extracted by the aqueous extractant stream, and the alcohol-depleted hydrocarbon stream emerging overhead is transferred through line 343 to storage or further processing.

The aqueous extractant stream, now containing alcohols in solution, flows from the bottom of extractor 342 through line 344, and is transferred by pump 345 through line 346 into heater 347, together with recycled water, by which it is diluted, preferably to a solubilizer concentration below about 20 percent. Makeup water is added as needed through line 348, ahead of pump 345. The diluted stream is heated to a temperature above about 60° C., and is transferred through line 349 into hot separator 350. Vapors emerging from the hot separator through line 351 are condensed in cooler 352, and the condensate is recycled through line 353, reflux drum 354, line 355, and line 346 to the inlet of heater 347. Liberated alcohols form a separate phase in separator 350 and are withdrawn through line 356, line 357, cooler 358, and line 359. The aqueous phase in separator 350, containing dissolved alcohols, is withdrawn through line 360, valve 361, and line 362 and introduced into stripper 363 at an intermediate point. The dissolved alcohols and the diluent water are stripped from the entering stream by reboiler 364, and are taken overhead through line 365, condenser 366, and line 367 into separator 368. The aqueous phase from the separator is recycled through line 369, valve 370, and line 371 to the rich extractant stream entering heater 347 through line 346. The alcohol phase is withdrawn from separator 368 through line 372, and is combined with alcohols from line 356 and sent through line 357, cooler 358, and line 359 to storage or further processing.

The alcohol-depleted extractant solution emerging from the bottom of stripper 363 through line 373 passes through heat exchanger 374 and line 375, and is recycled by pump 376 through line 377 to the top of extractor 342. Makeup extractant solution is added as required through line 378, ahead of pump 376.

My invention will be more fully understood from the following specific examples:

*Example I*

A hydrocarbon stream, prepared by hydrogenating carbon monoxide in the presence of a fluidized, alkali-promoted iron catalyst, was found to have the following composition:

| Component | Proportion | | |
|---|---|---|---|
| | mole-percent | vol.-percent | wt.-percent |
| Alcohols | 11.07 | 11.70 | 12.72 |
| Carbonyl compounds | 4.11 | 4.28 | 4.65 |
| Acids | 7.84 | 8.35 | 10.24 |
| Hydrocarbons | 76.98 | 75.67 | 72.39 |

The hydrocarbon stream was scrubbed with a dilute solution of sodium hydroxide to remove organic acids therefrom. An aqueous solution of sodium organic-acid salts was thereby obtained, in which the constitutent organic acids had an average molecular weight of 142. The aqueous solution was subjected to evaporation to form extractant solutions of a series of solubilizer concentrations. Subsequently, a series of extraction experiments was carried out with each of the various concentrations of extractant solution. In each series, a 2-liter portion of the acid-free hydrocarbon stream, containing 1.17 moles/liter of alcohols and 0.421 mole/liter of carbonyl compounds, was shaken 15 minutes with successive 500-ml. portions of the extractant solution at room temperature or at somewhat elevated temperature as required to maintain the extractant solution in the liquid state. The resulting aqueous extracts were steam distilled to separate alcohols and carbonyl compounds therefrom, and the distillates were analyzed. The results were as follows:

ALCOHOLS EXTRACTED, CUMULATIVE MOLE —PERCENT

| Solubilizer concentration, percent by weight | 24.0 | 28.7 | 37.5 | 46.6 | 55.4 |
|---|---|---|---|---|---|
| Extraction No.: | | | | | |
| 1 | 32.3 | 34.1 | 47.4 | 57.1 | 68.6 |
| 2 | 45.0 | 51.2 | 61.8 | 76.4 | 88.9 |
| 3 | 59.2 | 62.8 | 77.4 | 84.5 | 93.0 |
| 4 | 63.9 | 70.3 | 85.5 | 90.2 | 94.6 |
| 5 | 70.4 | 72.9 | 88.2 | 91.8 | 93.9 |
| 6 | 71.3 | 73.9 | | | |
| 7 | 75.7 | 79.2 | | | |
| 8 | 76.8 | 80.1 | | | |

CARBONYL COMPOUNDS EXTRACTED, CUMULATIVE MOLE—PERCENT

| | | | | | |
|---|---|---|---|---|---|
| 1 | 13.5 | 15.3 | 16.4 | 24.6 | 39.5 |
| 2 | 22.0 | 24.6 | 33.1 | 42.7 | 61.6 |
| 3 | 29.5 | 34.0 | 45.4 | 56.5 | 74.2 |
| 4 | 35.6 | 40.6 | 51.3 | 63.8 | 81.2 |
| 5 | 43.9 | 49.2 | 54.0 | 67.4 | 84.9 |
| 6 | 48.6 | 54.0 | | | |
| 7 | 52.0 | 58.8 | | | |
| 8 | 56.5 | 63.4 | | | |

*Example II*

A hydrocarbon solution of organic oxygenated compounds, obtained by the hydrogenation of carbon monoxide in the presence of a fluidized, alkali-promoted iron catalyst, was washed free of organic acids with aqueous sodium hydroxide solution. The resulting aqueous solution was stripped free of dissolved organic materials other than salts, and the stripped organic materials were returned to the caustic-washed hydrocarbon solution. The stripped aqueous solution was further concentrated to produce an aqueous extractant solution containing 40 percent by weight of sodium salts of the total mixture of organic acids, predominantly aliphatic carboxylic acids, present in the original hydrocarbon solution.

Subsequently, a three-liter portion of the caustic-washed hydrocarbon solution was subjected to repeated extraction at approximately 30° C. with a 500-milliliter portion of the aqueous extractant solution. After each extraction, the aqueous extract phase was separated and steam-distilled, the organic phase stripped therefrom was analyzed, and the raffinate phase was again contacted with the stripped aqueous phase. The results were as follows:

While the foregoing examples illustrate the preferred forms of my invention, it will be understood that departures may be made therefrom within the scope of the specification and claims. In general, it can be said that any modifications or equivalents that would ordinarily occur to those skilled in the art are to be considered as lying within the scope of my invention.

This application is a continuation-in-part of my previous application, Serial No. 771,264, filed August 29, 1947, now abandoned.

In accordance with the foregoing description, I claim as my invention:

1. In a process for separating a preferentially oil-soluble organic oxygenated compound selected from the group consisting of alcohols, aldehydes, and ketones from a solution thereof comprising predominantly hydrocarbons, the steps which comprise contacting said solution with an aqueous extractant solution containing above about 30 percent by weight of a substantially non-surface-active salt of a preferentially oil-soluble carboxylic acid, and stratifying and separating an aqueous extract containing said preferentially oil-soluble organic oxygenated compound.

2. The process of claim 1 wherein said substantially non-surface-active salt is a water-soluble salt of a preferentially oil-soluble aliphatic carboxylic acid.

3. The process of claim 2 wherein said salt is an alkali-metal alkanoate.

4. The process of claim 1 wherein said aqueous extractant solution contains between about 30 and 60 percent by weight of said salt.

5. The process of claim 1 wherein said predominantly hydrocarbon solution of said preferentially oil-soluble organic oxygenated compound is contacted with said aqueous extractant solution at a temperature between about 20 and 100° C.

6. In a process for separating a preferentially oil-soluble organic oxygenated compound selected from the group consisting of alcohols, aldehydes, and ketones from a solution thereof comprising predominantly hydrocarbons, the steps which comprise contacting said solution with an aqueous extractant solution containing above about 30 percent by weight of a salt of a preferentially oil-soluble aliphatic carboxylic acid having fewer than twelve carbon atoms in the molecule, and stratifying and separating an aqueous extract containing said preferentially oil-soluble organic oxygenated compound.

7. In a process for separating a preferentially oil-soluble organic oxygenated compound selected from the group consisting of alcohols, aldehydes, and ketones from a solution thereof comprising predominantly hydrocarbons, the steps which comprise contacting said solution with an aqueous extractant solution containing

| Extraction No. | Fraction | Volume, ml. | Analysis | | Cumulative Removal | |
|---|---|---|---|---|---|---|
| | | | Alcohols, moles | Carbonyls, moles | Alcohols, mole-percent | Carbonyls, mole-percent |
| | Charging stock | 3,000 | 2.70 | 1.38 | | |
| 1 | Extract distillate | 123 | 1.01 | 0.11 | 37.3 | 8.0 |
| 2 | do | 72 | 0.55 | 0.09 | 57.6 | 14.5 |
| 3 | do | 48 | 0.30 | 0.06 | 68.9 | 18.8 |
| 4 | do | 33 | 0.18 | 0.04 | 75.7 | 21.7 |
| 5 | do | 24 | 0.11 | | 79.7 | |
| 6 | do | 18 | 0.06 | | 81.9 | |
| 7 | do | 18 | 0.05 | | 83.6 | |
| 8 | do | 12 | 0.02 | | 84.3 | | above about 30 percent by weight of a solubilizer consisting essentially of salts of a mixture of preferentially oil-soluble aliphatic carboxylic acids having an average of less than eleven carbon atoms in the molecule, and stratifying and separating an aqueous extract containing said preferentially oil-soluble organic oxygenated compound.

8. In a process for separating a preferentially oil-soluble organic oxygenated compound selected from the group consisting of alcohols, aldehydes, and ketones from a solution thereof comprising predominantly hydrocarbons, the steps which comprise contacting said solution with an aqueous extractant solution containing above about 30 percent by weight of a solubilizer consisting essentially of salts of a mixture of preferentially oil-soluble aliphatic carboxylic acids wherein the major portion of said acids contain fewer than twelve carbon atoms in the molecule, and stratifying and separating an aqueous extract containing said preferentially oil-soluble organic oxygenated compound.

9. In a process for separating a preferentially oil-soluble organic oxygenated compound selected from the group consisting of alcohols, aldehydes, and ketones from a solution thereof comprising predominantly hydrocarbons, the steps which comprise contacting said solution with an aqueous extractant solution containing above about 30 percent by weight of a substantially non-surface-active salt of a preferentially oil-soluble aliphatic carboxylic acid, stratifying and separating an aqueous extract containing said preferentially oil-soluble organic oxygenated compound, and recovering said preferentially oil-soluble organic oxygenated compound from said aqueous extract.

10. In a process for separating generically dissimilar organic compounds from a heterogeneous liquid mixture consisting essentially of a normally liquid hydrocarbon, water, and at least one preferentially oil-soluble organic oxygenated compound selected from the group consisting of alcohols, aldehydes, and ketones, the steps which comprise stratifying said mixture and separating a hydrocarbon phase therefrom at an elevated temperature, contacting said hydrocarbon phase with an aqueous extractant solution containing above about 30 percent by weight of a substantially non-surface-active salt of a preferentially oil-soluble aliphatic carboxylic acid, and stratifying and separating an aqueous extract containing said preferentially oil-soluble organic oxygenated compound.

11. In a process for purifying a hydrocarbon mixture obtained in the hydrogenation of carbon monoxide over an iron catalyst, said hydrocarbon mixture containing preferentially oil-soluble organic oxygenated compounds, the steps which comprise contacting said hydrocarbon mixture with an aqueous extractant solution containing above about 30 percent by weight of a solubilizer consisting essentially of salts of a mixture of the preferentially oil-soluble aliphatic carboxylic acids of the class predominating in said hydrocarbon mixture, and stratifying and withdrawing a purified hydrocarbon mixture containing a substantially diminished proportion of organic oxygenated compounds.

12. In a process for separating preferentially oil-soluble organic oxygenated compounds from a predominantly hydrocarbon mixture comprising a preferentially oil-soluble organic acid and another preferentially oil-soluble organic oxygenated compound selected from the group consisting of alcohols, aldehydes, and ketones, the steps which comprise contacting said hydrocarbon mixture with an aqueous extractant solution containing an alkaline compound and above about 30 percent by weight of a substantially non-surface-active salt of a preferentially oil-soluble carboxylic acid having fewer than twelve carbon atoms in the molecule, and stratifying and separating an aqueous extract containing said preferentially oil-soluble organic oxygenated compounds.

13. The process of claim 12 wherein said substantially non-surface-active salt is a water-soluble salt of a preferentially oil-soluble aliphatic carboxylic acid.

14. The process of claim 13 wherein said salt is an alkali-metal alkanoate.

15. The process of claim 12 wherein said aqueous extractant solution contains between about 30 and 60 percent by weight of said salt.

16. The process of claim 12 wherein said predominantly hydrocarbon solution of said preferentially oil-soluble organic oxygenated compound is contacted with said aqueous extractant solution at a temperature between about 20 and 100° C.

17. In a process for purifying a hydrocarbon mixture obtained in the hydrogenation of carbon monoxide over an iron catalyst, said hydrocarbon mixture containing preferentially oil-soluble organic oxygenated compounds, the steps which comprise contacting said hydrocarbon mixture with an aqueous extractant solution containing an alkaline compound and above about 30 percent by weight of a solubilizer consisting essentially of salts of a mixture of the preferentially oil-soluble carboxylic acids of the class predominating in said hydrocarbon mixture, and stratifying and withdrawing a purified hydrocarbon mixture containing a substantially diminished proportion of organic oxygenated compounds.

References Cited in the file of this patent

UNITED STATES PATENTS

| Number | Name | Date |
|---|---|---|
| 1,828,356 | Burwell | Oct. 20, 1931 |
| 1,995,324 | Peeniman | Mar. 26, 1935 |
| 2,237,301 | Burk et al. | Apr. 8, 1941 |
| 2,258,500 | Mertens | Oct. 7, 1941 |
| 2,274,750 | Soenksen et al. | Mar. 3, 1942 |
| 2,535,071 | Walker | Dec. 26, 1950 |

OTHER REFERENCES

Fischer: Conversion of Coal into Oils, pub. by Ernest Benn, Ltd., London (1925), pages 241–246.

Koch: Bunnstaff-chemie, vol. 61, No. 20, pages 382–7 (1935).

Fieser et al.: Organic Chemistry, pub. by Heath, Boston (1944), pages 206–9.

U. S. Naval Tech. Mission in Europe, October 1945, pages 1, 73 and 80 to 88.